United States Patent [19]
Smith

[11] Patent Number: 5,664,132
[45] Date of Patent: Sep. 2, 1997

[54] DIRECTIONAL ACTUATOR FOR ELECTRONIC MEDIA NAVIGATION

[75] Inventor: Derek K. W. Smith, Richmond Hill, Canada

[73] Assignee: International Business Machines Corporation, Armonk, N.Y.

[21] Appl. No.: 437,446

[22] Filed: May 8, 1995

[30] Foreign Application Priority Data

May 20, 1994 [CA] Canada .................. 2124028

[51] Int. Cl.⁶ .................. G06F 15/00; G09G 5/34; G09G 5/08
[52] U.S. Cl. .................. 345/352; 345/326; 345/123; 345/146
[58] Field of Search .................. 395/155, 157, 395/159, 161, 156; 345/123, 125, 146

[56] References Cited

U.S. PATENT DOCUMENTS

| | | | |
|---|---|---|---|
| 5,263,134 | 11/1993 | Paal et al. | 395/158 |
| 5,392,388 | 2/1995 | Gibson | 395/159 |

FOREIGN PATENT DOCUMENTS

| | | |
|---|---|---|
| 0 249 293 | 12/1987 | European Pat. Off. . |
| 0249293 | 12/1987 | European Pat. Off. . |
| 0493900 | 7/1992 | European Pat. Off. . |
| 0 493 990 | 7/1992 | European Pat. Off. . |
| 0533424 | 3/1993 | European Pat. Off. . |
| 2680899 | 3/1993 | France . |

OTHER PUBLICATIONS

IBM Technical Disclosure Bulletin, vol. 36, No. 4, Apr. 1993, pp. 399–403.

R.D. DeWid, "Scroll Control Box", IBM Technical Disclosure Bulletin, vol.36, No. 4, pp. 399–403, Apr. 1993.

Primary Examiner—Raymond J. Bayerl
Assistant Examiner—Ba Huynh
Attorney, Agent, or Firm—Norman L. Gundel

[57] ABSTRACT

Complete navigation of electronic media through very fine movements of a pointing device by application of a directional actuator having a next page actuator, previous page actuator, and media movement actuator. Errors associated with coarse pointing device movement are removed, and the usable display area inside the window frame is increased. Complete navigation includes horizontal, vertical and diagonal movement with a gradient of speed.

5 Claims, 8 Drawing Sheets

FIG. 1

Introducing IBM CSet++ V2.1 and KASESet

Object oriented development.

CSet++ Version 2.1 for OS/2* from IBM Software Solutions is one of the most complete object-oriented application development package you can buy.

Plus.

Its 32 bit C/C++ compiler with its advanced code optimizer and WorkFrame/2\2.1 - a completely new development environment based on OS/2's object-oriented CSet++Workplace Shell-allows you to create up-to-the-minute mission critical applications.

You also receive a specially tailored copy of Kaseworks KASESet, a visual design and code generation tool which allows you to build visual applications even more quickly with a minimal investment in learning time.

Plus.!

| CSet++ Technical Features |
|---|
| Standards conforming C/C++ computer |
| Optimizer for 1386, 1486 and Pentium (TM) processors |
| Extensive C++ Class Libraries plus NEW drop/drop support |
| Visual PM Debugger with object-oriented features |
| Graphical C++ Class Browser |
| Visual Trace Analyze tool |
| Precompiled headers |
| Developer's Toolkit new V2.1 with tools for multimedia and SOM application |

To order CSet++ for OS/2 including KASESet or for further information call 1-800-342-6672 (USA) or 1-800-463-7999 ext. 676

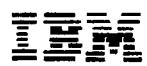

FIG. 3

Introducing IBM CSet++ V2.1 and KASESet

Object oriented development.

CSet++ Version 2.1 for OS/2* from IBM Software Solutions is one of the most complete object-oriented application development package you can buy.

Plus.

Its 32 bit C/C++ compiler with its advanced code optimizer and WorkFrame/2\2.1 - a completely new development environment based on OS/2's object-oriented CSet++ Workplace Shell-allows you to create up-to-the-minute mission critical applications. You also receive a specially tailored copy of Kaseworks KASESet, a visual design and code generation tool which allows you to build visual applications even more quickly with a minimal investment in learning time.

| CSet++ Technical Features |
|---|
| Standards conforming C/C++ computer |
| Optimizer for 1386, 1486 and Pentium (TM) processors |
| Extensive C++ Class Libraries plus NEW drop/drop support |
| Visual PM Debugger with object-oriented features |
| Graphical C++ Class Browser |
| Visual Trace Analyze tool |
| Precompiled headers |
| Developer's Toolkit new V2.1 with tools for multimedia and SOM application |

To order CSet++ for OS/2 including KASESet or for further information call 1-800-342-6672 (USA) or 1-800-463-7999 ext. 676

Plus.!

IBM

DIRECTIONAL ACTUATOR FOR ELECTRONIC MEDIA NAVIGATION

FIELD OF THE INVENTION

The present invention relates to the transformation of both graphics and text from paper media to electronic digitized media for view on a window on a physical display screen on a computer system, and is more particularly directed to a device to permit the accurate navigation of the electronic digitized media through confined movement of a pointing devise such as the cursor.

BACKGROUND OF THE INVENTION

The display of electronic digitized media on a computer display screen is very well known in the art, and is often accomplished by displaying the digitized media inside a window. However, the window dimensions are often smaller than the entire display of the media, with the result that the window frame cuts off large portions of the media. The media often cannot be properly sized within the window frame if it is particularly complex and sizing down will cause the text or graphics to be unreadable.

Because the electronic digitized media is likely to overlap the size of the window, several methods are proposed in the prior art for permitting the user to bring hidden portion of the media into view of the window.

For example, as shown on page 8 of "Microsoft"® Windows™ Users Guide", Copyright 1992, Microsoft Corporation, a pair of scroll bars are provided at the peripheral edge of the display window when the electronic digitized media is actually larger in size than the physical display window. A vertical scroll bar (designated by vertically pointing "up and down" arrows) permits vertical movement of the media within the bounds of the window. Movement is activated by placing the graphical marker of a pointing device (e.g. a mouse cursor or a roller ball) over the scroll bar and pressing a button on the pointing device. If the graphiced marker is placed in either the up or down scroll arrow, the media is moved up or down one line, respectively. If the graphical marker is placed on the scroll bar, then the media is moved up or down one screen. If the scroll box is dragged in the scroll bar, the media is moved concurrently to a new vertical position until dragging ceases.

A horizontal scroll bar (designated by left and right pointing arrows) provides horizontal movement of the media with the bounds of the window. Again, movement is activated by the user placing the graphical marker over the horizontal scroll bar and pressing a button on the pointing device. If the graphical marker is placed on either the left or the right scroll arrow, the media is moved up or down one column. If the graphical marker is placed on the scroll bar, then the media is moved left or right one full screen. If the scroll box is dragged in the scroll bar, the media is concurrently moved to a new horizontal position until dragging ceases.

There are a number of problems associated with the use of horizontal and vertical scroll bars. Very course movements of the pointing device usually traversing the window, are required to locate the graphical marker over a bar area for selection, and movement in placement of the graphic marker is prone to error, particularly for less experienced or occasional computer users. For example, sensitivity and tracking speed varies between systems, and as a result, overshoot and undershoot placement problems are common amongst users. Other placement problems depend upon the experience of a user with a particular pointing device used in the system.

Also, the scroll bars added to the window frame reduce the client or display area for text within the window. In addition to the foregoing, simple diagonal movement of the media within the window is not possible, but instead, many successive operation on the horizontal and vertical scroll bars are desirable to achieve a diagonal movement effect.

The Asymetrix® Multimedia Toolbook®, Copyright 1989, 1991 by Asymentrix Corporation, provides a software construction set for windows. A number of multimedia wigets, such as horizontal and vertical sliders, buttons, and link sliders, are provided to permit movement of media within a window.

The sliders and buttons are prone to the same problems of the previously described scroll bars provided by Microsoft Windows, namely the lack of sensitivity of the pointing device in the users hands, and the lack of an ability of simple diagonal movement. The sliders and buttons also encroach into the client area of the window in this system.

While the link sliders provide diagonal movement of the media, movement is restricted to that of the aspect ratio of the window, and as such, does not permit diagonal movement of the entire media within or into the viewing area.

Another approach for providing movement of media within a window involves a point-click-drag operation as described in U.S. Pat. No. 5,196,838 of Apple Computer Inc. Movement of the graphical marker into the window area turns the marker into an iconic "hand". By clicking a button on the tracking device, the media is effectively attached to the marker and movement of the pointing device permits the movement of the media in the same direction. While this approach does overcome problems associated with the horizontal and vertical to sliders discussed above, a plurality of point-click-drag-release operation are required to adjust the view and to navigate the entire media, and this plurality of operations if often frustrating to the users and renders navigation difficult.

The foregoing problems of the prior art are further amplified in Notepads and Thinkpads™ which employ a Trackpoint II pointing device. The Trackpoint II device requires an even greater manual dexterity than the ordinary mouse tracking device, and positioning a graphical marker accurately is even more difficult.

In addition to the foregoing, none of the prior art attempts provide a "gradient of speed" for moving the media in or into a window frame.

SUMMARY OF THE INVENTION

It is therefore an object of the present invention to provide a directional actuator for receiving very fine movements of the pointing device.

It is a further object of the present invention to provide a means for permitting full diagonal movement of the media displayed in a window for a range of different physical dimensions.

A further object of the invention is to provide a gradient of speed for range of slow to fast movement of the media as displayed in a window.

A further object of the invention is to provide a directional actuator separated from the bounds of a display window.

Finally, another object of the invention is to provide to the user a compact actuator permitting the user navigational abilities with a single page or rapidly through multiple pages of digited electronic media.

Accordingly, the present invention provides a navigational device for actuating movement of displayed electronic media in viewing area on computer display. The device consists of a plurality of fields in close proximity. Each field is associated with one of at least eight evenly distributed compass points around a circuit. The selection by the user of one of the fields causes movement of the electronic media in the view area in a direction corresponding to the compose point associated with the selected field.

The present invention also provides a meter for an electronic media navigator. The meter consists of a plurality of fields associated with a gradient of speeds. The selection of one field by the user sets a speed associated with the selected field for navigation movement of displayed electronic media.

A BRIEF DESCRIPTION OF THE DRAWINGS

The embodiments of the invention will now be described in detail in association with the following drawings in which:

FIG. 1 is a representation of a sample marketing brochure for media transformation;

FIG. 3 illustrates, in schematic representation, both the portion of the digitized brochure actually displayed on the physical display screen and the remainder of the brochure stored in memory available for view in a window on a physical display screen;

DETAILED DESCRIPTION OF THE PREFERRED EMBODIMENTS

A typical marketing brochure 1 in FIG. 1, this being a example from International Business Machines Corporation, is shown.

Assume that the physical dimensions of this particular brochure are 8.5"×11". The brochure includes a number of graphical objects and a number of text objects. The text objects include several different fonts having a range of small to large point sizes. The sizing of the brochure is sufficient to permit a user to easily read all portions of the brochure.

The representation of FIG. 1 is an example only, and the location and size of the various objects varies from brochure to brochure. Also, a brochure may contain multiple pages.

The sample marketing brochure 1 of FIG. 1 is transferred from paper media into electronic digitized media through use of a conventional scanning system such as the Hewlett Packard Scanjet Plus™. The output from the scanner is a file on a computer media such as a diskette.

Figure 2:
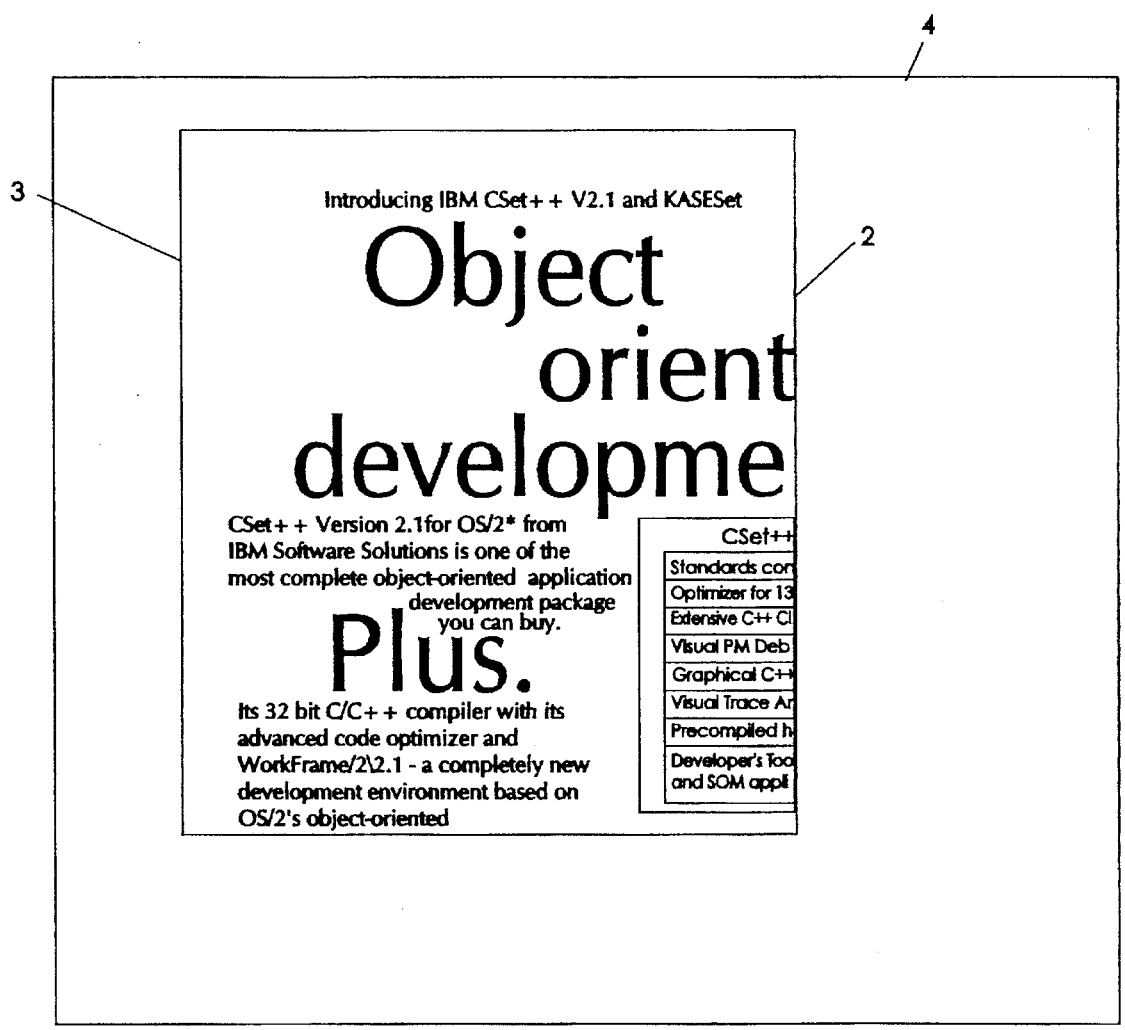
FIG. 2 illustrates the sample marketing brochure digitized and displayed in a window on a physical display screen.

The electronic digitized media transformation of the brochure 2 is illustrated in a window 3 of a computer display screen 4 in FIG. 2. As can be seen, only a portion of the media is actually displayed within the software window 3 on a physical display screen. The physical dimensions of a typical display screen are such that it is impossible to view the entire electronic representation of the 8.5"×11" media brochure, particularly if the media is transformed at a resolution and size to provide unscaled high quality printing of the brochure and to provide easy unconstrained reading of the text objects (which vary in size) for the user.

FIG. 3 illustrates schematically that the remainder of the media 5 is stored in memory and available for navigation into the viewing area of the window. As illustrated, a significant amount of navigation is required to view and read the entire brochure.

Therefore, navigation of the media in the window is required to enable the user to read the entire brochure from the window.

Figure 4A:
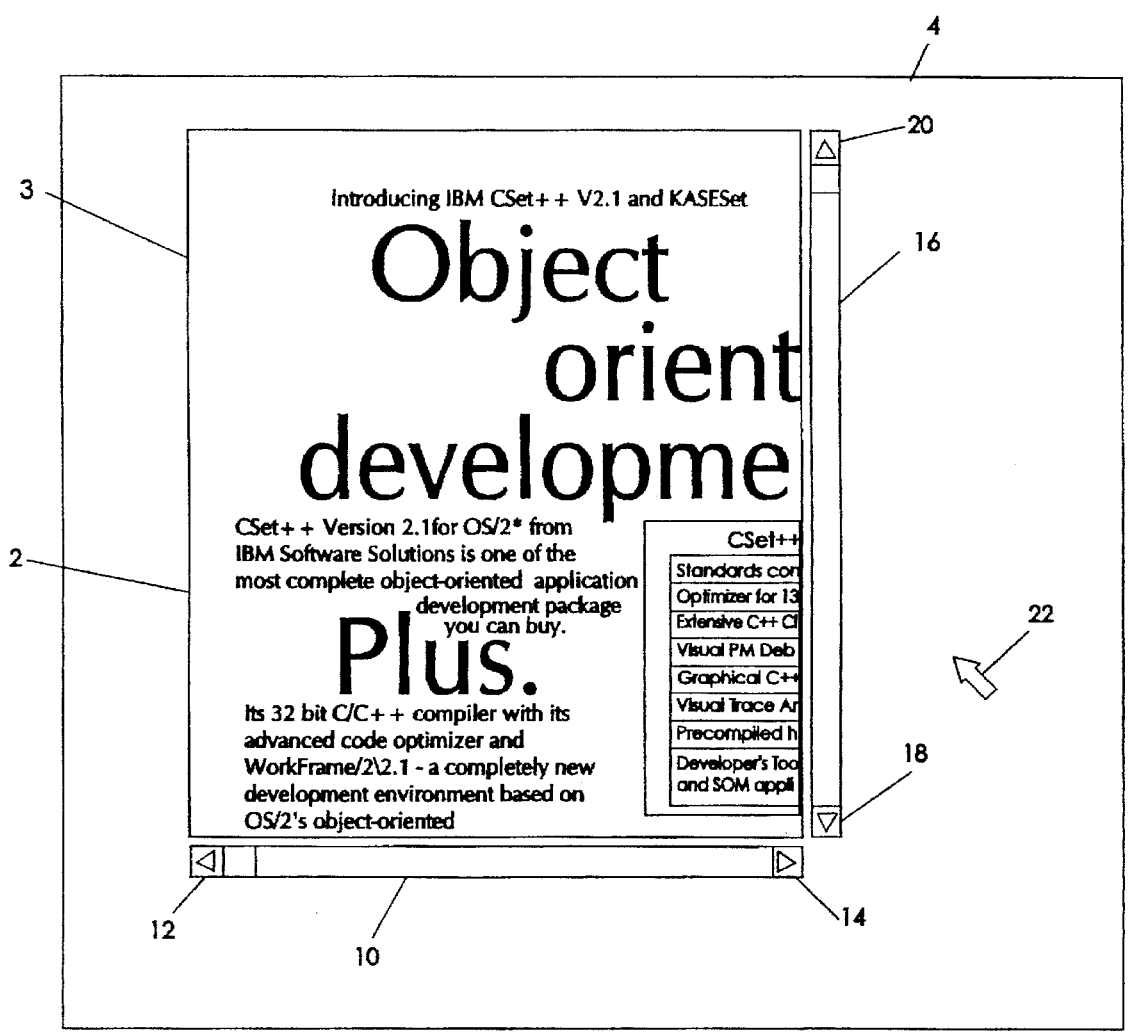
FIG. 4A illustrates a prior art technique of slider bars to permit movement of the digitized brochure in a window on a physical display screen.
Figure 4B:
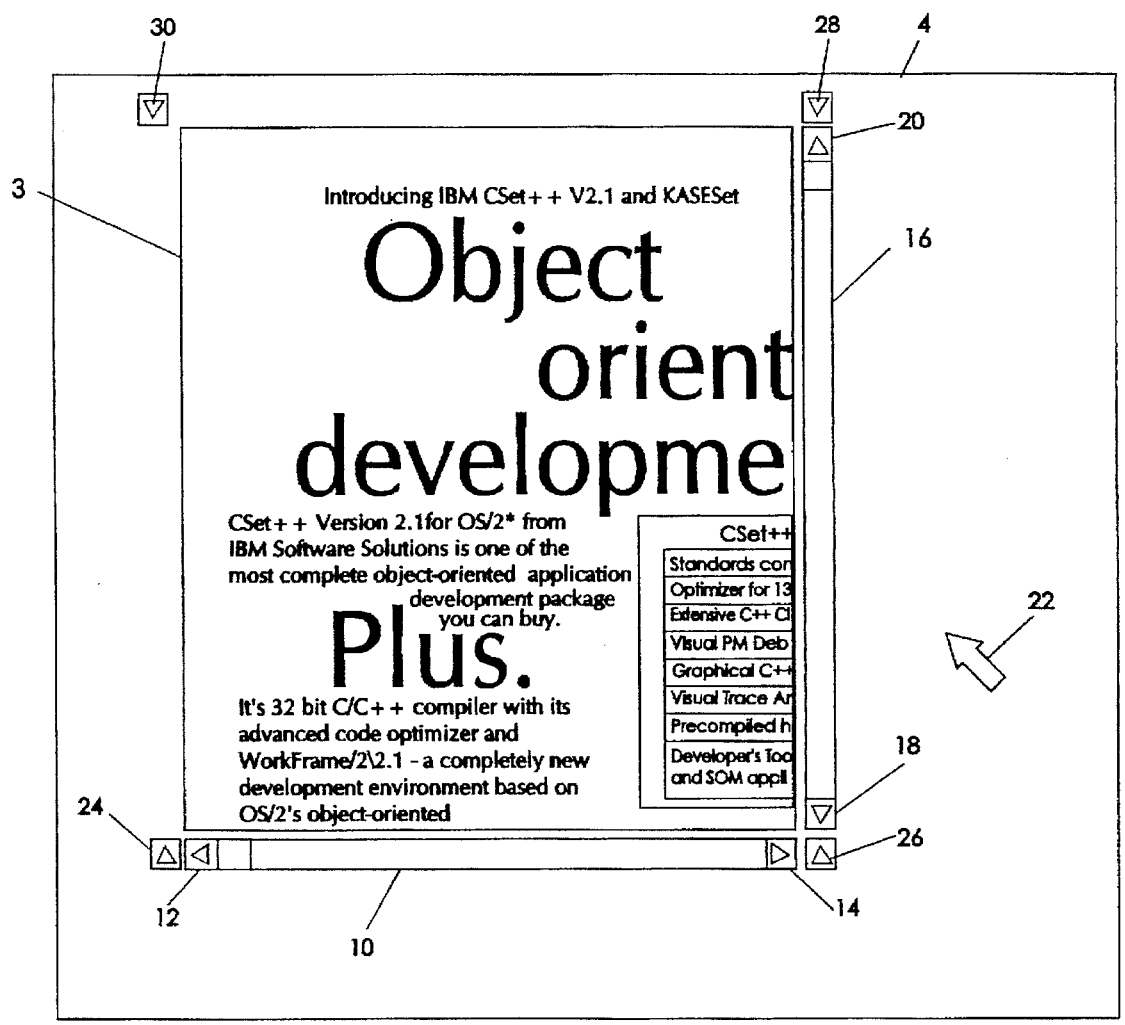
FIG. 4B illustrates the prior art technique of slider bars and diagonal buttons to provide movements of the digitized brochure in a window on a physical display screen.

FIGS. 4A and 4B illustrate two prior art systems for providing navigation described earlier in this specification. In FIG. 4A, a pair of slider bars 10 and 16 are shown at right angles on a window frame 6 containing the displayed portion of the digitized brochure 2. The horizontal slider bar 10 includes horizontal directional arrows 12 and 14 for moving the text either to the left or right respectively. The vertical slider bar 16 includes directional arrows 18 and 20 for moving the digitized media up and down in the window respective.

As earlier described, the media is moved in the window by moving a graphical marker 22 associated with a pointing device (not shown) over a slider bar and clicking a button. Where the graphical markers click directly over a directional arrow, the media is caused to move a single line or column, whereas clicking the marker over the bar itself causes the media to move an entire frame in the desired direction. This system provides mutually exclusive vertical and horizontal movement of the media by coarse movements of the pointing device to locate the graphical marker.

In the system illustrated in FIG. 4B, buttons 24, 26, 28 and 30 are added at the four corners of the software display window. These buttons permit diagonal movement in the window by moving the graphical marker associated with the pointing device over one of the diagonal buttons, and clicking on a button in the pointing device. Again, this system provides movement of the media by course of the pointing device to locate the graphic marker 22.

Figure 5:
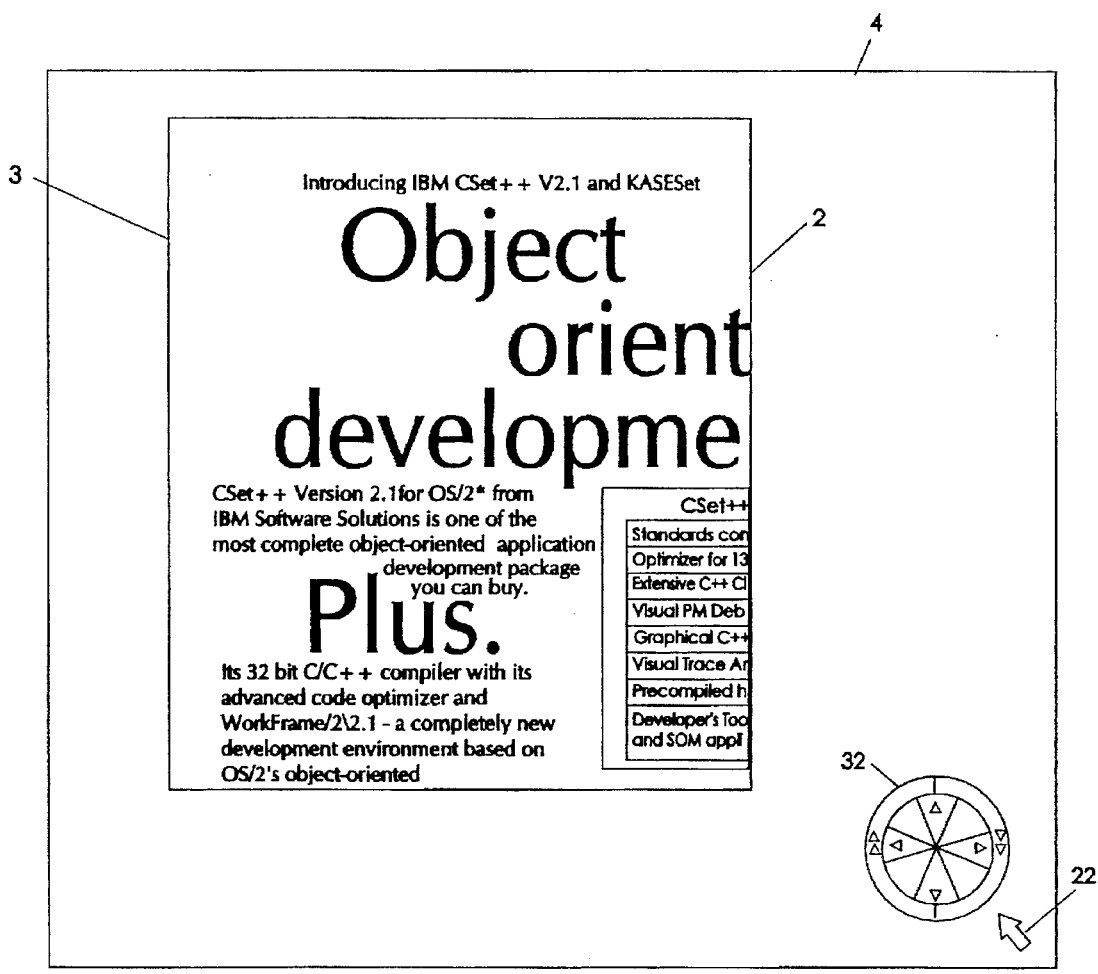
FIG. 5 illustrates the digitized brochure in a window in combination with a navigational device according to the embodiment of the present invention.

FIG. 5 illustrates the preferred embodiment of the present invention. A directional actuator or navigator 32 is located on the physical display screen 4, and this directional actuator is capable of providing horizontal, vertical, and diagonal movement of the media in the display window through very fine movements of a pointing device by locating the marker 22 over particular hot spots (as described below) of the directional actuator. The directional actuator also provides a next page and previous page selection for brochures of multiple pages transformed into electronic digital media. Because the navigator is located outside the window frame, it does not encroach on the client area of text display in the window. Removal of the directional scroll bars and linkers of the prior art frees up further viewing area in the window.

Also, location of the navigator outside any window frame means that the navigator is not "tied" into any particular window. In the preferred embodiment of the invention, the navigator operates on any window with the current focus in the presence of multiple windows displayed at a time, and changes the focus to a different window to permit navigation in that different window.

Figure 6:
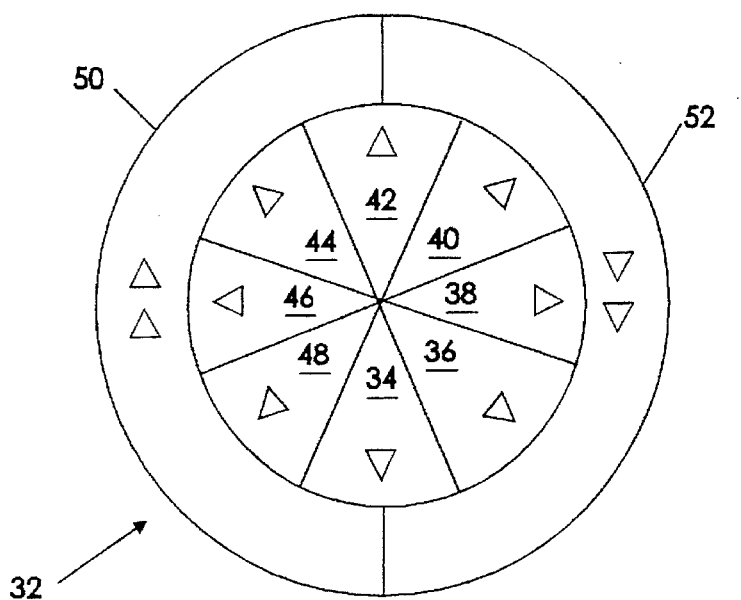
FIG. 6 is an enlarged view of the navigational device of FIG. 5.

FIG. 6 illustrates an enlarged view of the directional actuators 32 shown in FIG. 5. The directional actuator 32 is a compound of fields in close proximity that permit electronic media navigation. As illustrated in FIG. 6, the inner ring of "pie-shaped" fields 34 through 8 are the fields associated with the media movement within a single page of a brochure. Around the perimeter, the two semi-angular fields 50 and 52 represent the previous page and next page actuators, respectively.

While the illustration of the preferred embodiment shows the fields as being discrete, the fields could also be associated with a continuous gradient of directional points.

Not all the fields of movement are available at any particular time. Movement of the graphical marker into and out of the object area causes a change to the shape of the graphical marker to indicate to the user the availability of a specific directional actuator event.

For example, in the object direction actuator;
  to handle mouse Enter
    set sysCursor to 36—set system cursor to a large dot.
  end mouse Enter
  to handle mouse Leave
    set sysCursor to 1—set system cursor to default arrow
  end mouse Leave Thus, the actuator 32 consists of three main objects, namely the next page actuator 52, the previous page actuator 50 and the media movement actuator collectively represented by fields 34 to 48.

Activation of the media viewer loads the media file into memory with the view of the window as shown in FIG. 2.

An activation sequence, according to the preferred embodiment of the invention, could include the following steps:

1. open the first media file from the brochure list.
2. determine the width of the media, set width.
3. determine the height of the media, set height.
4. determine the width of the display window, set win Width
5. determine the height of the display window, set win Height.
6. display a portion of the media in the window.

The next page actuator is activated in the preferred embodiment by moving the graphical marker over the next page object and clicking the button on the pointing device. Other method of activation could include touch selection, or the user simply moving the graphical marker into a field. The latter method would be particularly useful for permitting a user to quickly and smoothly peruse a large brochure without the "stop and go" interruptions caused by clicking the pointing device.

The next page actuator loads the next file, if the brochure list includes a next file (i.e. a multiple page brochure transformed into electronic digitized media). If the brochure is a single file, the next page actuator is disabled.

For example:

1. if brochure list >1 then
2. open the next media file
3. display next media file else do nothing endif The previous page actuator is activated by moving the graphical marker over the previous page object and clicking a button on the pointing device. The previous page actuator loads the previous file, if the brochure listing includes a previous file, again a multiple page brochure. If the brochure was a single file, the previous page actuator is disabled.

Figure 7:
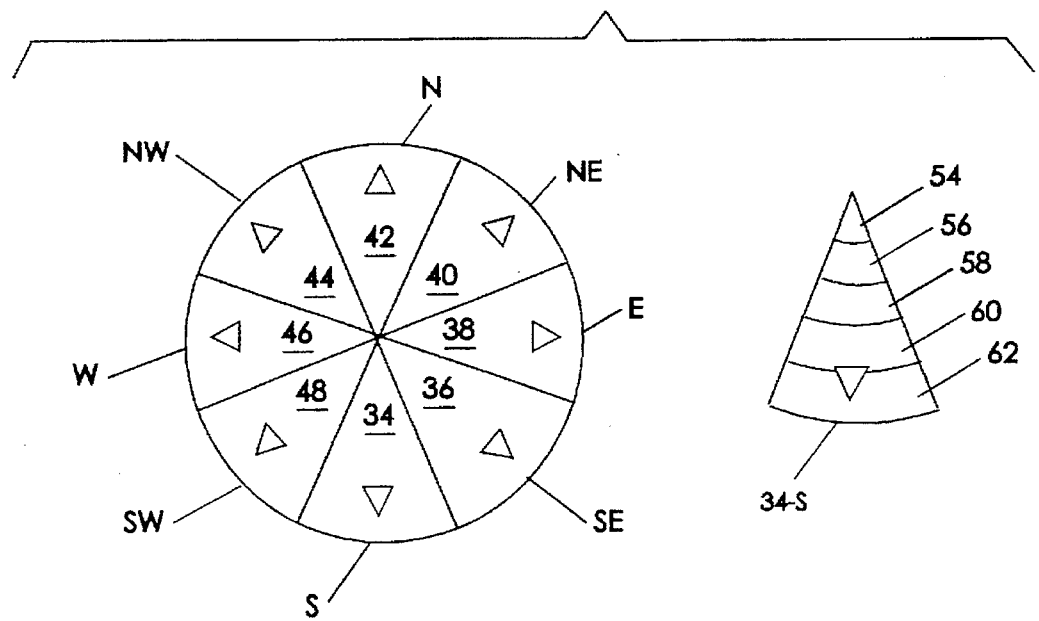
FIG. 7 is an enlarged view of the directional actuators of the navigational device according to the preferred embodiment of the present invention.

For example 1. if brochure list >1 then
2. open the previous media file
3. display previous file else do nothing endif The third main object, the media movement actuator collectively represented by the fields 34 through 48 are illustrated in detail in FIG. 7.

The media movement actuator includes eight fields or sub-objects, each being conveniently labelled by the compass direction in the preferred embodiment illustrative of the intended directional movement.

A particular object is activated by moving the graphic marker over one of the eight objects and clicking a button on the pointing device. Once activated, the media will move in the direction of the particular object a number of pre-defined units. If the media is at a page limit, no further movement in that particular direction is possible.

In the preferred embodiments, each of the eight objects includes a speed gradient (illustrated in the lower right hand corner of FIG. 7) extending from the centre to the peripheral edge of the object. Thus, if the user places the graphical marker over a region around the apex of a particular sub-object (e.g. at 54), clicking the button will cause the media to move in the desired direction very slowly. However, if the graphical marker is placed over a region towards the periphery of the subject (e.g. at 62) then clicking the button will move the media rapidly in the desired direction. Movement is effected by executing the directional field.

The gradient speed over each sub-object may be either a linear, dual rate or expediential relationship to arrive at very specific speeds and accuracy in the direction desired, essentially scaling the movement of the media in the window.

Figure 8:
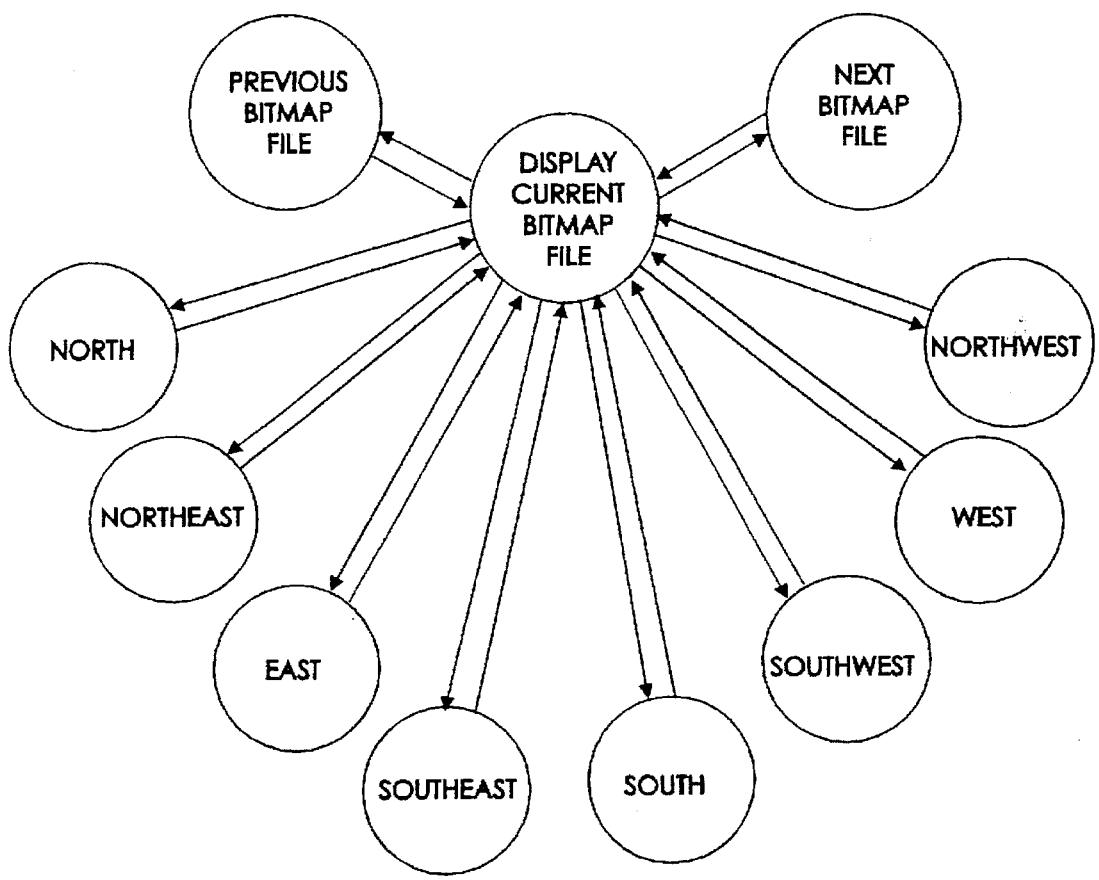
FIG. 8 is a finite state machine representation of the navigational device according to the preferred embodiment of the invention.

The finite state machine illustrated in FIG. 8 controls the logic of the present invention. The Display Current Bitmap File State is the initial state. Transfer from the initial state to any of the ten other states is controlled by placing the graphical marker over an area of the compound object of FIG. 6 and clicking a button on the pointing device (note, area of compound object corresponds to each state). All ten states always return to the initial state. A brief description of the logic of each states follows:

DISPLAY CURRENT BITMAP FILE

- may xfer to any of the ten other states
- system variables
    - x (current coord)
    - y (current coord)
    - width (width of media file)
    - height (lieight of media file)
    - win Width (width of display window)
    - win Height (height of display window)
  1. open first media file from brochure list
  2. set x to 0 }    initial view coords
     set y to 0 )
  3. set width of media }  Actual dimensions
     set width of media }
  4. set win Width of window }Window view dimensions
     set win Height of window
  5. display portion of first media file in view of window

NORTH STATE

- must return to Display Current Bitmap File State
- system variables x, y
- local variable speed

```
to handle button Down
    if region 1, set speed to 5.
    if region 2, set speed to 10
    if region 3, set speed to 15
    if region 4, set speed to 20
    if region 5, set speed to 25
    if y <0
        increment y by speed
        display media file at new coords (x,y)
    endif
end button down
```
NORTH EAST STATE

- must return to Display Current Bitmap File State
- system variables x, y, width, win Width
- local variable speed
```
to handle button Down
    if region 1, set speed to 5
    if region 2, set speed to 10
    if region 3, set speed to 15
    if region 4, set speed to 20
    if region 5, set speed to 25
    if y <0
        increment y by speed
    endif
    if x> - (width-win Width)
        decrement x by speed
    endif
    display media file at new coords (x, y)
end button Down
```
EAST STATE

- must return to Display Current Bitmap File State
- system variables x, y, width, win Width
- local speed
```
to handle button Down
    if region 1, set speed to 5
    if region 2, set speed to 10
    if region 3, set speed to 15
    if region 4, set speed to 20
    if region 5, set speed to 25
    if x > -(width-win Widtli)
        decrement x by speed
    endif
    display media file at new coords (x, y )
end button Down
```
SOUTH EAST STATE

- must return to Display Current Bitmap File State
- system variables x,y, width, win Width, win Height, win Height
- local variable speed
```
to handle button Down
    if region 1, set speed to 5
    if region 2, set speed to 10
    if region 3, set speed to 15
    if region 4, set speed to 20
    if region 5, set speed to 25
    if x > -(width-win Width)
        decrement x by speed
    endif
    if y > - (height - win Height)
        decrement y by speed
    endif
    display media file at new coords (x, y)
end button Down
```
SOUTH STATE

- must return to Display Current Bitmap File State
- system variables x,y, height, win Height,
- local variables, speed
```
to handle button Down
    if region 1, set speed to 5
    if region 2, set speed to 10
    if region 3, set speed to 15
    if region 4, set speed to 20
    if region 5, set speed to 25
    if y > -(height-win Height)
        decrement y by speed
    endif
    display media file at new coords (x, y)
end button Down
```
SOUTH WEST STATE

- must return to Display Current Bitmap File State
- system variables x,y, height, win Height,
- local variable, speed
```
to handle button Down
    if region 1, set speed to 5
    if region 2, set speed to 10
    if region 3, set speed to 15
    if region 4, set speed to 20
    if region 5, set speed to 25
    if x < 0
        increment x by speed
    endif
    if y > -(height- win Height)
        decrement y by speed
    endif
    display media file at new coords (x, y)
end button Down
```
WEST STATE

- must return to Display CLIrrent BitMap File State
- system variables, x, y
- local variable speed
```
        if region 1, set speed to 5
        if region 2, set speed to 10
        if region 3, set speed to 15
        if region 4, set speed to 20
        if region 5, set speed to 25
    if x < 0
        increment x by speed
    endif
    display media file at new coord (x, y)
end button Down
```
NORTH WEST STATE

- must return to Display Current BitMap File State
- system variables, x, y
- local variableS speed
```
        if region 1, set speed to 5
        if region 2, set speed to 10
        if region 3, set speed to 15
        if region 4, set 2peed to 20
        if region 5, set speed to 25
    if y < 0
        increment y by speed
    endif
    if x < 0
        increment x by speed
    endif
    display media file at new coord (x, y)
end button Down
```

In order to accommodate brochures of different physical dimensions, the diagonal movement objects (NE, SE, SW, NW) of the media movement actuator are capable of receiving a gradient of slopes. For a standard 8.5" by 11" brochure, the slope is −1.29 and the x, y coordinates for diagonal movement are scaled according to this gradient of slope factor to provide accurate diagonal movement.

For a brochure with physical dimensions of 11"×8.5", the slope is −0.77 and the x, y coordinates for diagonal movement are scaled accordingly. The home position (0,0) for the above slope calculations is the upper left hand corner of a page.

The preferred embodiments of the invention have been described in detail, but modifications will be obvious to the ones skilled in the art, and such modifications are intended to be covered by the appended claims.

The embodiments of the invention in which an exclusive property or privilege is claimed are defined as follows:

1. A data processing system, for varying the display of a multiple page electronic media which displays a portion of a single page, comprising:

a computer display having multiple viewing areas, each such viewing area for displaying a portion of a single page of a multiple page electronic media, one of said viewing areas having focus; and a navigational device displayed on the computer display, user input to said navigational device providing input to the viewing area having focus, as a result of that viewing area having focus, said navigational device including a circle surrounded by a ring, said circle being divided into a first plurality of at least eight proximate fields, each field of said first plurality of proximate fields being associated with one of at least eight evenly distributed compass points, user selection of each field of said first plurality of proximate fields causing scrolling, in a direction of the associated compass point, of the electronic media displayed in the viewing area having focus, and said ring being divided into a second plurality of at least two proximate fields, user selection of one field of said second plurality of proximate fields causing display of the next page of the electronic media in the viewing area having focus and user selection of another field of said second plurality of proximate fields causing display of the previous page of the electronic media in the viewing area having focus.

2. The data processing system of claim 1 wherein the navigational device is displayed outside the viewing area having focus.

3. The data processing system of claim 1 wherein the fields of the first plurality of proximate fields are uniformly shaped.

4. The data processing system of claim 3 wherein the first plurality of proximate fields includes a number of uniformly shaped proximate fields sufficient to provide a substantially continuous gradient of compass points.

5. The data processing system of claim 1 wherein the fields of the second plurality of proximate fields are uniformly shaped.

* * * * *